United States Patent Office 3,577,255
Patented May 4, 1971

3,577,255
PIGMENT DISPERSIONS
Frederick E. Petke, Princeton, N.J., assignor to
Cities Service Company
No Drawing. Continuation-in-part of application Ser. No. 715,151, Mar. 22, 1968. This application Nov. 29, 1968, Ser. No. 780,298
Int. Cl. C09c 3/02
U.S. Cl. 106—308
19 Claims

ABSTRACT OF THE DISCLOSURE

Highly concentrated stable base pigment dispersions in organic solvents are prepared by adding pigment to an organic solvent or a blend of miscible organic solvents in the presence of surfactant. The rate of pigment addition is adjusted so that proper wetting out of the pigment in the solvent occurs. Pigment addition is continued until a high shear mass is obtained. This mass is then subjected to agitation for a sufficient period of time to break down pigment agglomerates and to disperse the pigment throughout the organic solvent. In order to obtain a base pigment dispersion composition that can be readily mixed with additional solvent and binder material, the viscosity of the high shear mass may be reduced by mixing additional organic solvent therewith. Pigment concentrations of from about 45% to about 90% by weight of the resulting base pigment dispersions are obtained. Any suitable binder material may thereafter be incorporated in the base pigment dispersion composition to produce a finished pigment-binder dispersion composition of high gloss and excellent dispersion characteristics. Great adaptability in determining the characteristics of the final coating composition can be achieved when the pigment is initially dispersed in a solvent blend rather than a single organic solvent. In addition, the desirable properties of the final composition are often enhanced by the use of such a solvent blend.

CROSS-REFERENCE TO RELATED APPLICATION

This application is a continuation-in-part of applicant's copending application, Ser. No. 715,151, filed Mar. 22, 1968, and entitled "Pigment Dispersions" which was assigned to the assignee of the present application.

BACKGROUND OF THE INVENTION

Field of the invention

This invention relates to the production of highly concentrated base pigment dispersions. More particularly, it relates to the production of base pigment dispersions from which a variety of pigment coating compositions may be readily obtained.

Description of the prior art

In the production of pigmented coating compositions, it is often desirable to have available in storage a pre-mixed base dispersion from which the final pigment coating composition can be prepared as desired. For this purpose, so-called "chip dispersions" are often employed. Such "chip dispersions" are prepared by pre-blending the dry pigmentary color and a binder material, together with a plasticizer and small amounts of other ingredients, such as an organic solvent, surfactants, and anti-sticking agents. This mixture is subjected to high shear milling, as on a two roll mill, for a period generally of about 3 to about 10 minutes. During this milling, a sheet or film of the mixture is formed. This plastic sheet is taken off the mill and is stacked on carts to cool. The sheets are then broken up to form chips, which are the chip dispersions referred to above. The chip dispersions will typically contain from about 35% to about 50% by weight of resinous material. The chip dispersion can thereafter be dissolved in an organic solvent in high speed mixing equipment to obtain a composition in a form usable in producing coating compositions.

While such chip dispersions are useful base dispersion compositions, they are nevertheless accompanied by certain inherent disadvantages relating both to their production and their ultimate use. Chip dispersions are relatively expensive to produce. The pre-blending of the ingredients of the chip dispersion on a two roll mill is necessarily expensive as both equipment and operating costs are high. Since such pre-blending is normally accomplished in batches of from about 30 lbs. to about 80 lbs. per batch, the labor costs associated with the production of chip dispersions is likewise high. Furthermore, the second milling operation required an order to form the desired coating composition results in a very high overall cost of producing the desired coating composition by means of a chip dispersion base composition.

It will also be readily apparent that any particular chip dispersion will have a utility only with respect to the production of an ultimate pigment dispersion composition based upon the same resinous or plastic-type binder as was employed in the production of the chip. In order to have base dispersions available in storage that can be used for the preparation of a variety of inks or other coating compositions, therefore, a variety of chip dispersions of the desired pigment in each of the various resins or plastic-type binders would be required. Inventory costs are also, therefore, relatively expensive. In addition, it has been found that many chip dispersions tend to become insoluble as a result of aging when stored in dry form, thereby adding to the disadvantages associated with the use of such chip dispersions.

It is an object of the present invention, therefore, to provide an improved base pigment dispersion composition.

It is another object of the present invention to provide an improved process for the production of highly concentrated, base pigment dispersions.

It is another object of the present invention to provide base pigment dispersions that may be employed in the production of a variety of coating compositions.

It is a further object of the present invention to provide an improved process for the production of coating compositions by means of highly concentrated, base pigment dispersions.

SUMMARY OF THE INVENTION

The objects of the present invention are accomplished by the preparation and use of highly concentrated base pigment dispersions in organic solvents. The base pigment dispersions of the present invention can be economically prepared, are stable in storage, and can be employed in the production of the wide variety of finished pigment dispersion coating compositions. These compositions are characterized by excellent pigment dispersion and high gloss.

The highly concentrated base pigment dispersions of the present invention are prepared by adding pigment to an organic solvent in the presence of surfactant. The pigment may be added to a surfactant-containing organic solvent in batch form, or the pigment, organic solvent, and surfactant may be mixed in a continuous operation. The rate of addition of the pigment to the organic solvent is adjusted so that wetting out of the pigment in the organic solvent occurs. For this purpose, it is often desirable to reduce the rate of pigment addition as the pigment concentration of the mixture increases. The pigment addition is continued until the pigment concentration is such that a high shear mass is obtained. The high shear mass is thereafter subjected to agitation for a sufficient period of time to break down any agglomerates that may be present and to disperse the pigment uniformly throughout the organic solvent. In order to make the resulting base pigment dispersion more readily suitable for admixture with a binder material, it is often desirable to reduce the viscosity of the highly concentrated, base pigment dispersion in organic solvent by means of an additional quantity of organic solvent. The resulting base pigment dispersions of reduced viscosity will ordinarily have a pigment concentration of from about 45% to about 90% by weight of the base dispersion.

In another aspect of the invention, the pigment may initially be dispersed in a blend of two or more miscible organic solvents rather than in a single solvent. The base pigment dispersion thus obtained will have greater adaptability for use in coating applications with particular requirements or specifications. The base pigment dispersions in organic solvent blends also, in many instances, enhance the ultimate properties of the final composition. Additional quantities of organic solvent may be added to the base dispersion in solvent blend in order to reduce the viscosity of the base dispersion. The organic solvent employed for this purpose may be one of those in the solvent blend or another suitable miscible organic solvent or solvent combination.

The base pigment dispersion in solvent, or the base dispersion of reduced viscosity, may thereafter be utilized for the production of a wide variety of finished pigment-binder dispersion compositions. Such compositions may be employed as inks or for other coating applications. Any suitable binder material may thereafter be incorporated in the base pigment dispersion to produce the finished composition. These finished pigment dispersion compositions have been found to have high gloss and excellent dispersion characteristics.

DETAILED DESCRIPTION OF THE INVENTION

Base pigment dispersions in organic solvents, produced as set forth herein, are stable and highly flexible compositions useful in the manufacture of a variety of inks and other coating compositions. A base pigment dispersion in organic solvent or solvent blend can thus be stored and readily utilized in the production of any desired coating composition incorporating a particular pigment in a suitable resinous or plastic-type binder material. The present invention, however, is not limited to base pigment dispersions of any particular pigmentary material. Any suitable pigment, either of an inorganic or of an organic nature, may be readily employed. As well known in the art, such pigmentary grade material will ordinarily have a particle size of about one micron or less. Illustrative of the variety of inorganic pigments that may be employed in the practice of the present invention are the chrome yellows, such as primrose, light and medium shades; molybdate oranges, such as lead chromates modified with molybdenum; chrome oranges, such as lead chromates without molybdenum; iron blues, such as the Milori blues; titanium dioxide; iron oxide pigments, such as the red and yellow shades; extender pigments, such as clays, calcium carbonates, blanc fixe, i.e. barium sulfate, and the like; and carbon black.

Illustrative of the various organic pigments that may be employed in the present invention are phthalocyanine pigments, quinacridone pigments, vat pigments, and organic azo pigments. Examples of suitable phthalocyanine pigments are phthalocyanine blue and phthalocyanine green pigments, including partially brominated green pigments.

Examples of suitable quinacridone pigments may be employed in accordance with the present invention include Du Pont Monastral Red Y and Harmon Quindo Magenta.

Illustrative vat pigments are Carbazol Violet, Hydron Blue R G and Hydron Pink. Illustrative organic azo pigments include the Lithol reds, 2 B reds and BON Reds.

The base pigment dispersions are prepared by adding the desired pigmentary material, as for example the pigments indicated above, to any suitable organic solvent and surfactant. The present invention is not limited to the use of any particular organic solvent as any readily available organic solvent useful generally in the dispersion field may be employed in the practice of the present invention. The organic solvent may, for example, be a hydrocarbon solvent, such as an aromatic or aliphatic hydrocarbon solvent, an alcohol, an acetate, a ketone, or the like. Illustrative of the aromatic hydrocarbon solvents that may be employed are toluol, xylene, and high boiling naphthenic base solvents such as those boiling within a range of about 590–630° C. The aliphatic solvents may be employed include high boiling solvents, such as fractionated high boiling petroleum solvents, and low boiling aliphatic solvents, such as n-heptane, naphthas, and commercially available VM & P, i.e. varnish maker and paint.

Illustrative of the alcohols useful as organic solvents in the practice of the present invention are n-propanol, isopropyl alcohol, and butanol. Examples of suitable acetate solvents include ethyl acetate, n-propyl acetate, isopropyl acetate, butyl acetate and "Butyl Carbitol," which is an acetate ester of butyl ether of di-ethylene gylcol. Examples of suitable ketone solvents include methyl ethyl ketone, methyl amyl ketone, and cyclohexanone.

As previously indicated, the pigment may be dispersed initially in a blend of two or more miscible solvents rather than in a single solvent. As will be appreciated by those skilled in the art, the particular components of the solvent blend will be determined by a variety of factors, including the availability of solvents; the pigment employed; the binder composition or compositions with which the pigment dispersion is to be utilized; governmental controls, such as air pollution regulations; and the properties of the coating composition, such as the solubility of the film former and the wetting characteristics and drying speed of the ultimate coating composition. In addition to their enhanced adaptability for use in a variety of coating compositions, pigment dispersions in solvent blends can be used to form improved dispersions in the ultimate dispersion vehicle, or binder. Ultimate coating compositions prepared with pigment dispersions in solvent blends have been found to be high grade dispersions having high gloss and low settling characteristics, together with enhanced flow, strength and transparency properties. In some instances, the necessary or desirable drying speeds of the finished inks, lacquers, coating compositions or paints can be achieved, together with other desired properties, most conveniently by the use of a base pigment dispersion.

The solvent blend of the present invention may comprise any suitable combination of two or more miscible organic solvents. In Examples XIII–XVII hereof, illustrative solvent blends dsclosed include n-heptane and n-propyl alcohol; n-heptane and isopropyl acetate; VM & P naphtha, n-propyl acetate and 2-nitro-propane. Other illustrative solvents include higher and lower boiling ketones and combinations of such ketones and hydrocarbon solvents, the combination of ester solvents and ketones, and the like. Those skilled in the art will readily appreciate that such examples are merely illustrative of the wide variety of solvent combinations that may be employed in accordance with the present invention.

The solvent blend herein disclosed may comprise two or more miscible organic solvents mixed either in equal proportions or otherwise. The proportions of each solvent component in the blend are not critical and may be varied to meet the particular circumstances of each given application. It is also within the scope of the invention to employ one or more of the solvents used in the solvent blend, or a different solvent, in the subsequent step of adding additional solvent to form a base pigment dispersion of reduced viscosity. In still another aspect of the invention, a single organic solvent may be employed in the formation of the base pigment dispersion in solvent, with one or more different and miscible organic solvents being employed thereafter in reducing the viscosity of the base dispersion. In such an event, the final base pigment dispersion will be in a solvent blend and will have the adaptability and other advantages mentioned above. In the description that follows concerning the technique for incorporating the pigment in the organic solvent and for forming an essentially uniform dispersion therein, the term "organic solvent" is meant to denote the use of either a single organic solvent or a blend of miscible organic solvents.

In accordance with the present invention, the pigment is added to the organic solvent in the presence of a surfactant. For this purpose, any readily available surfactant or combination of surfactants may be employed. The surfactant or surfactant combination may include either cationic, anionic, or non-ionic surfactants or a combination of these types. In addition, the surfactant or surfactant combination employed may be either water soluble, water dispersible, or oil soluble. While the invention is not limited to any particular class or type of surfactant the following are illustrative examples of specific surfactants that have been employed: tall oil fatty acid; Ester 253, a polyphosphoric ester of a higher alcohol, furnished by Pflaumer Bros., Co.; Lorol diethanolamine; polyethylene polyamine condensate of castor oil; Rosin Amine D, manufactured by Hercules Powder Company, soya lecithin, and Tyzor TLF 2005, an organic titanate comprising polyhydroxy stearate.

As indicated above, the pigment is added to the organic solvent in the presence of a surfactant either in a batch process or in a continuous operation. In either case, the pigment is added to the solvent at a rate that permits wetting out of the pigment in the organic solvent. The term "wetting out," as used herein, refers to the thorough distribution of the pigment particles, including pigment agglomerates, throughout the body of the organic solvent. If the pigment is added so rapidly that it does not properly wet out, it will be appreciated that the subsequent breaking up of agglomerates and forming of an essentially uniform dispersion will be hindered. In addition, adding pigment more rapidly than it can properly wet out would most likely result in the stalling of the mixer. As the pigment, organic solvent, and surfactant are mixed, with the relative proportion of pigment generally increasing, the power input requirements will, of course, generally increase. The heat generated by the mixing operation will likewise increase. This initial mixing phase of the process is continued until a high shear mass is obtained.

The overall power input requirements in order to produce the high shear mass will depend upon various factors, such as the particular pigment being employed, the particular organic solvent into which the pigment is being mixed, and the particular pigment-organic solvent-surfactant system employed, as well as the characteristics of the particular mixing equipment employed. It can readily be appreciated that the particular mixing equipment employed should be capable of developing high shear as the mixing is to be continued until a high shear mass is produced. Likewise, it is usually convenient and desirable that the subsequent agitation of the high shear mass, without further addition of pigment, be accomplished in the same equipment in which the high shear mass was produced. For this reason, it is convenient to carry out the mixing operation of the present invention in conventional equipment capable of developing high shear, such as the Baker Perkins M–P or multipurpose type mixer. The particular equipment in which the mixing operation takes place is, however, not a critical feature of the present invention. Other commonly available equipment, such as a conventional plastics extruder, or a double arm mixer, may readily be employed.

After the high shear mass has been produced, this mass is thereafter subjected to agitation in order to break up agglomerates of pigment and to insure the substantially uniform dispersion of the pigment in the organic solvent. This operation may conveniently be carried out in the same mixing equipment as was used in the formation of the high shear mass. During this phase of the process, additional pigment will not ordinarily be incorporated into the mass since, as indicated above, the purpose of this operation is to break down agglomerates and to insure the substantially uniform dispersion of the pigment throughout the highly concentrated dispersion mass. While the period of time is not critical, agitation in a double arm mixer will generally be from about two to five hours.

After the agglomerates have been broken down and the pigment dispersed essentially uniformly throughout the organic solvent, the resulting composition comprises a highly concentrated, stable base pigment dispersion in organic solvent. While the amount of pigment in the base dispersion is not critical, the dispersion will generally contain from about 55% to about 95% by weight of pigment. Generally speaking, base pigment dispersions prepared with inorganic pigments will have a higher percentage of pigment than in similar base pigment dispersions prepared with organic pigments. Thus, base pigment dispersions prepared with inorganic pigments will often have a concentration of from about 90% to about 95% by weight of the base dispersion, whereas base pigment dispersions prepared with organic pigments will often have a pigment concentration of from about 55% to about 65% by weight of the base dispersion. These concentration ranges are not critical, however, as pigment concentrations outside these ranges can also be prepared.

The concentration of organic solvent or solvents in the dispersion upon agitation of the high shear mass will ordinarily range from about 5% to about 45% by weight of the base pigment dispersion. The concentration of surfactant in the base pigment dispersion will ordinarily range from about 2% to about 10% by weight of the base pigment dispersion. When a particularly effective surfactant or surfactant combination is employed, the surfactant concentration will ordinarily be within the range of from about 2% to about 6% by weight of the base pigment dispersion. Surfactant concentrations of up to 10% of the base dispersion are employed when using relatively less effective surfactant compositions.

While base pigment dispersions in organic solvents are obtained upon agitation of a high shear mass of pigment, organic solvent, and surfactant, the relatively viscous nature of the resulting base dispersion often makes subsequent mixing of this base dispersion with a desired binder material and additional solvent difficult. For this reason, it is often desirable to form a base pigment dispersion of reduced viscosity. Ths can readily be accomplished by mixing in additional solvent with the base pigment dispersion. Most conveniently, this addition of organic solvent may be accomplished in the same mixing equipment heretofore employed in the preparation of the base pigment dispersion. The resulting dispersion of somewhat reduced viscosity can thereupon be removed from the mixer as a stable base dispersion in convenient form for storage and for mixing with any desired binder material together with additional solvent.

After addition of solvent to the base pigment dispersion in the mixer, a modified base pigment dispersion in organic solvent is obtained. This modified base dispersion, of course, still has a relatively high proportion of pigment therein. The proportion of pigment in the resulting base pigment dispersion of reduced viscosity will generally be within the range of from about 45% to about 90% by weight of the resulting base pigment dispersion. The surfactant concentration will again generally be in the range of from about 2% to about 10% by weight of the resulting base dispersion. The organic solvent or solvents will generally have a concentration ranging from about 10% to about 50% by weight of the modified base pigment dispersion.

The amount of pigment in the base pigment dispersion in organic solvent will generally depend on a number of factors, such as the particular pigment employed, the organic solvent used, type of mixer employed, the surfactant added, and the like. In the following table, the proportion of pigment in various illustrative base pigment dispersions that have been prepared is set forth. Pigment concentrations are given both with respect to the initial base pigment dispersion obtained by agitation of the high shear mass and the base dispersion of reduced viscosity obtained by the subsequent addition of organic solvent.

TABLE

| Pigment | Organic solvent | Percent pigment in base pigment dispersion | Percent pigment in base pigment of reduced viscosity |
| --- | --- | --- | --- |
| $TiO_2$ | Toluol | 93 | 85.4 |
| Medium chrome yellow | n-Heptane | 90 | 88 |
| Barium lithol | Toluol | 55 | 45 |
| 2B red | Isopropyl acetate | 68 | 61 |
| Iron oxide red | Carbitol acetate | 73 | 68 |
| Calcium lithol | Toluol | 57 | 49 |
| Molybdate orange | Methyl ethyl ketone | 90 | 86 |
| $TiO_2$ | Cyclohexanone | 87 | 85 |

As previously indicated, each base pigment dispersion in solvent may be used for the preparation of a variety of inks and other coating compositions utilizing that particular pigment and a suitable resin or plastic-type binder material. Finished coating composition may be prepared with hard resins and plastic-type binders, such as ester gum, nitrocellulose, chlorinated rubber, solution type vinyl resins, ethylcellulose, polyamides and epoxy resins.

The binder material and the base dispersion will ordinarily be blended in conventional equipment, such as a Waring Blendor, Cowles Dissolver, or Kady Mill, in order to produce the finished coating composition. As well known in the art, such equipment is capable of providing impact mixing sufficient to assure thorough dispersion of the pigment throughout the finished composition. In addition to the hard resin or film former, additional organic solvent will ordinarily be employed in the preparation of the finished composition. This solvent is employed in order to soften or dissolve the binder material, thus facilitating the blending of the binder material and the base pigment dispersion. The particular organic solvent and the amount employed will, of course, depend upon the particular resin or film forming material to be employed as the binder in the finished coating composition. It will readily be appreciated that various other conventional ingredients, such as plasticizers and non-settling aids, may be employed in the preparation of the finished coating composition.

The present invention is hereinafter further described with reference to particular examples thereof. It will be appreciated that these examples are presented for illustrative purposes and should not be construed as limitations on the invention as hereinabove described.

EXAMPLE I

A toluol lithol rubine dispersion was prepared by charging 2200 grams of toluol and 480 gms. of tall oil fatty acid to a five gallon double arm mixer. With the mixer running, 2000 gms. of lithol rubine were added. The pigment "wet out" in approximately 10 minutes. An additional 600 gms. of lithol rubine was then added and mixed for approximately 15 minutes. Thereafter, an additional 500 gms. of lithol rubine pigment was added, and the mixture was mixed for an additional 15 minutes. Another 300 gms. of the pigment was then added, and mixing was continued for an additional 15 minutes. A final addition of 200 gms. of lithol rubine pigment was made, and the high shear mixture was allowed to run for approximately three hours. During this mixing period, the mass became more fluid and the pigment aggregates were broken down so that a heavy, smooth pigment dispersion was obtained. The viscosity of this dispersion was then reduced by the addition of 1720 gms. of toluol. The resulting base pigment dispersion contained 46.2% pigment, 6.2% tall oil fatty acid, and 47.6% toluol.

The base pigment dispersion was thereafter reduced in a Waring Blendor with an additional quantity of toluol followed by the addition of chlorinated rubber. A color dispersion in a chlorinated rubber solution was obtained that was of equal quality in gloss and transparency to that obtained by milling the lithol rubine pigment in chlorinated rubber on a two-roll mill to form a chip dispersion and subsequently dissolving the chip in toluol.

EXAMPLE II

In this example, a four inch Baker Perkins MP (multipurpose) continuous mixer was employed. A medium chrome yellow pigment was charged into the mixer at a rate of 2 lbs. per minute. A fractionated petroleum solvent having a boiling range of 535° F. to 585° F. and a kauri butanol value of 28, and having dissolved therein 19.0% of Ester 253, i.e. polyphosphate ester of a fatty alcohol and 4.25% of Lorol diethanolamine, was also charged to the mixer at the rate of 0.352 lb. per minute. Lorol is a mixture of saturated straight chains from $C_6$ to $C_{18}$, averaging approximately $C_{12}$. The blend thus metered into the mixer had a composition of 85.00% medium chrome yellow pigment, 2.75% ester 253 surfactant, 0.50% Lorol diethanolamine, and 11.75% fractionated petroleum solvent. The mixer was operated at 60 r.p.m. and consumed 2.1 gross HP. The base pigment dispersion discharged from the mixer at the rate of 2.352 lbs. per minute and was of excellent quality insofar as strength and pigment dispersion characteristics are concerned. This dispersion, when mixed with a solution of Pentalyn K resin in the same high boiling solvent, produced a heat-set ink having high gloss characteristics.

In operations in which a continuous mixer is employed, as in Example II, the pigment is essentially instantaneously wet out in the solvent and agitation of the resulting mass occurs during its passage through the mixer. The extent of mixing may be controlled by varying the discharge rate of the mixer.

EXAMPLE III

To a one gallon double arm mixer was added 300 gms. of toluol, 50 gms. of Rosin Amine D, 75 gms. of Polyethylene Polyamine Condensate of Castor Oil, and 25 gms. of Epoxidized Soy Bean Oil stabilizer. With cold water in the jacket and with the mixer running, 500 gms. of Resinated Red Lake C pigment was added to the mixer. After 10 minutes of mixing, 100 gms. of the pigment was added and mixing was continued for another 15 minutes. Thereafter 100 gms. of the Resinated Red Lake C pigment was added to the mixer. Finally, two additions of 25 gms. each of the Resinated Red Lake C pigment were added at 15 minute intervals. The mixer was then allowed to run for three hours and the viscosity of the resulting base pigment dispersion was reduced with 600 gms. of toluol. The final base pigment dispersion was obtained with a yield of 91.3% and had a composition of 52.00% pigment, 8.20% surfactant and stabilizer, and 39.80% toluol. The resulting base pigment dispersion and solvent, when formulated with chlorinated rubber and additional toluol, produced a highly satisfactory color dispersion in the chlorinated rubber solution. The transparency and gloss characteristics were equivalent to a similar formulation produced by milling the same pigment into chlorinated rubber, followed by solution in toluol.

EXAMPLE IV 400 gms. of toluol and 40 gms. of Loral Diethanolamine were added to a one gallon double arm mixer. With cold water in the jacket and with the mixer running, 700 gms. of Milori Blue pigment was added and the blend was mixed for five minutes. Additional Milori Blue pigment was added in five minute intervals. The first two additions were of 100 gms., the second two additions were 75 gms. each, and the final seven additions were of 25 gms. each. The resulting high shear mass was then agitated by allowing the mixer to run for about three hours. The high shear mass was then reduced with 560 gms. of toluol to produce a modified base pigment dispersion amounting to 96.2% by weight of the materials charged to the mixer. Final composition of the base pigment dispersion was 57.2% pigment, 1.9% surfactant, and 40.9% toluol. This blue base pigment dispersion, when reduced with additional toluol and a zincated rosin, produced a high gloss dispersion of excellent quality.

EXAMPLE V

A n-heptane medium chrome yellow base dispersion was prepared by adding 320 gms. of n-heptane and 54 gms. of soya lecithin to a one gallon double arm mixer. With cold water circulating in the jacket and with the mixer running, 2200 gms. of medium chrome yellow pigment were added. As soon as this pigment wet out, i.e. after approximately 5 minutes, 840 gms. of medium chrome yellow pigment was added and mixed until properly wet out. Another 400 gms. of pigment was then added and mixed for approximately 15 minutes. A final addition of 80 gms. of pigment was added, and the high shear mass was mixed continuously for three hours. This high shear mass was then reduced with 106 gms. of n-heptane. The resulting base color dispersion gave a reading of 6.0+ on the Hegeman gauge and possessed excellent gloss characteristics.

EXAMPLE VI

A medium chrome yellow-isopropyl acetate base dispersion was prepared by charging 115 lbs. of Ester 253 surfactant and 275 lbs. of isopropyl acetate to a 250 gallon double arm mixer. With cold water in the jacket, and with the mixer running, 1500 lbs. of medium chrome yellow pigment was added. As soon as this color had wet out, i.e. after approximately 15 minutes, an additional 500 lbs. of the pigment were added, followed by two additional 300 lbs. additions and two 200 lbs. additions of the medium chrome yellow pigment. A 100 lbs. addition of pigment was then made, followed by two 50 lb. additions. After each addition, sufficient time was permitted for the color to wet out before the next addition was made. After all of the additions had been completed, the resulting high shear mass was agitated for a period of about three hours. At the end of this period, 190 lbs. of isopropyl acetate were added, and the batch was thereafter removed from the mixer. The resulting base pigment dispersion was of excellent quality and was used in the production of nitrocellulose rotogravure printing ink. The finished inks were of good quality and of high gloss.

EXAMPLE VII 350 gms. of toluol and 75 gms. of Tyzor TLF–2005 organic titanate manufactured by E. I. du Pont were added to a 1 gallon double arm mixer equipped with sigma blades and with cooling water flowing through the jacket. The mixer was run until a partial solution of the titanate was obtained. A resinated Red Lake C (barium lake) was added to the mixer as follows: 500 gms. followed by mixing for 5 minutes; 200 gmes. and mixing for 10 minutes; 100 gms. and 10 minutes of mixing; two 50 gm.-additions each followed by 10 minute mixing; 25 gms. followed by 15 minute mixing; and a final addition of 25 gms. The high shear mass was then continuously mixed for approximately three hours. The color was added at a rate dependent on the wetting out of each color addition and at a rate, of course, not exceeding the power capacity of the mixer. Maximum shear was developed with the last addition of color and maximum heat evolution was also observed at this point. As the high shear mixing continued, the mass became both glossier and smoother. Evolution of heat likewise became less noticeable, the mass cooling down to room temperature at the end of the three hour mixing period. The mass was then reduced with 625 gms. of toluol. The finished base dispersion contained 50.5% pigment, 4.0% TLF–2005, and 45.5% toluol. The dispersion was found to be of excellent quality. By further reducing this dispersion with additional toluol in a Waring Blendor followed by the addition of 5 cps. chlorinated rubber, a colored coating composition was obtained that exhibited high gloss and excellent transparency.

EXAMPLE VIII

To a 5 gallon double arm mixer equipped with sigma blades and cooling water through the jacket, 2000 gms. of toluol, 240 gms. of a polyphosphate ester of a higher fatty alcohol, 240 gms. of lecithin and 100 gms. of an epoxidized soya bean oil were charged. Resinated Calcium Lithol Reg pigment was added in the following amounts and with the subsequent mixing periods indicated: 2000 gms.—5 minutes; two 500 gm. additions—each with 10 minute mixing periods; two 250 gms. additions—each with 10 minute mixing periods; two 200 gm. additions—the first with a 10 minute mixing period and the second with a 15 minute mixing period; and a final 100 gm. addition. Mixing was continued for 3½ hours. At the end of this period, no further heat was evolved from the mass, and power consumption had decreased. The heavy mass had become smooth and glossy. 2100 gms. of toluol were then added to slowly reduce the mass to a soft consistency. 8305 gms. of the base pigment dispersion were obtained. The composition of the dispersion was 48.2% Calcium Lithol pigment, 2.9% polyphosphate ester of fatty alcohol; 2.9% lecithin, 1.2% epoxidized soya bean oil and 44.8% toluol. This solvent dispersion was thereafter reduced with additional toluol and mixed with 5 cps. chlorinated rubber to produce a colored coating of excellent transparency and high gloss.

EXAMPLE IX

To a 100 gallon double arm mixer equipped with sigma blades, cooling jacket and 25 hp motor, 55 lbs. of polyphosphate ester of a higher fatty alcohol and 130 lbs. of isopropylacetate were mixed. The mixer drew 13 amperes. A medium chrome yellow pigment was added in the following quantities and with the indicated mixing times and power requirements: 700 lbs.—5 minutes at 16 amps.; 250 lbs.—10 minutes at 20 amps.; 150 lbs.—10 minutes at 20 amps.; 150 lbs.—10 minutes at 22–24 amps.; 100 lbs.—10 minutes at 22–24 amps.; 100 lbs.—15 minutes at 23–25 amps.; 50 lbs.—10 minutes at 23–26 amps.; 25 lbs.—10 minutes at 23–27 amps.; and 25 lbs. with mixing continued thereafter for 3 hours, initially at 23–28 amps. As mixing continued, the ammeter reading gradually decreased to 23–25 amperes and at the end of three hours showed very little fluctuation at a range of 17–18 amperes. At this point, the mass was glossy and smooth. 90 lbs. of isopropylacetate were added and mixed for 30 minutes and packed in drums. The base pigment dispersion contained 86% by weight pigment. The dispersion, after addition of ethylacetate and nitrocellulose, produced a coating composition of excellent dispersion and high gloss. Although not so modified in this instance, the dispersion can be modified with a conventional antisettling aid to prevent settling of the high gravity pigment.

EXAMPLE X

To a one gallon double arm mixer equipped with dispersion blades and cooling jacket was added 370 gms. of cyclohexanone and 120 gms. of polyphosphate ester of a higher fatty alcohol. With cooling water in the jacket and the mixer running, rutile titanium dioxide pigment was added as follows: 2200 gms.—mix 5 minutes; 280 gms.—mix 5 minutes; 380 gms.—mix 5 minutes; 200 gms.—mix 10 minutes; 150 gms.—mix 15 minutes; and 90 gms. The resulting high shear mass was mixed for three hours and was then reduced with 145 gms. of cyclohexanone. The resulting base pigment dispersion was glossy and smooth. The dispersion contained 22 lbs. per gallon and contained 88.2% titanium dioxide. When reduced with methyl ethyl ketone followed by the addition of vinyl resin, this base dispersion produced a light gloss vinyl coating of excellent dispersion.

EXAMPLE XI

To a one gallon double arm mixed equipped with sigma blades and a cooling jacket were added 175 gms. of soya lecithin and 350 gms. of VM & P naphtha. A primrose shade chrome yellow was added as follows: 2000 gms.—mix 5 minutes; 1000 gms.—mix 10 minutes; 700 gms.—mix 10 minutes; 350 gms.—mix 10 minutes; 250 gms.—mix 10 minutes; and 100 gms.—mix for four hours. At this point, the mass was glossy and smooth. 115 gms. of VM & P naphtha were added. The resulting base pigment dispersion contained 88% pigment and had a grind of 6.0+ on the Hegeman gauge. Upon addition of a suitable binder, this base dispersion is capable of producing coatings of high gloss by the addition of a suitable binder.

EXAMPLE XII

To a gallon double arm mixer equipped with sigma blades and a cooling jacket are added 175 gms. of soya lecithin and 350 gms. of methyl ethyl ketone. 4400 gms. of rutile titanium dioxide are added over a 35 minute period. The pigment is added continuously, but at a decreasing rate as rapidly as the pigment wets out. After all the pigment has been added, the mass is allowed to mix for 3½ hours. At this point, a glossy, smooth mass is obtained. 30 gms. of "Thixatrol," an anti-settling agent manufactured by Baker Castor Oil Co., is added and mixing is continued for 30 minutes. 250 gms. of methyl ethyl ketone are added to reduce the mass to fluid dispersion. This excellent dispersion can be used to produce high quality coatings by formulating with vinyl resins, chlorinated rubber, nitrocellulose and other film formers.

EXAMPLE XIII

The following were charged to a double arm mixer, with cooling water in the jacket; 350 grams of n-heptane, 155 grams of soya lecithin. With the mixer running, 1000 grams of medium chrome yellow pigment, DC 155 manufactured by Fred'k H. Levey Co. After mixing for three minutes, 1000 grams of additional pigment were added, and mixing was continued for three minutes. Another 500 grams of pigment were added, mixing was continued for four minutes. Another 380 grams of pigment were then added and mixed for five minutes. 300 grams of pigment were then added and, after mixing was continued for eight minutes, another 300 grams were added. After a ten minute mixing period, four 200 gram additions were made, with 10 minute mixing periods in between. A final 120 grams of pigment were then added to the mixture, and mixing of the resulting high shear mass was continued for three hours. The mass was then reduced with 140 grams of n-heptane and 170 grams of n-propyl alcohol. The resulting modified base pigment dispersion, recovered in a 99% yield, contained 85.1% pigment, 3.0% lecithin surfactant, 8.6% n-heptane, and 3.3% n-propyl alcohol. This dispersion can be used in the production of a variety of coating formulations each possessing high gloss and excellent dispersion characteristics.

EXAMPLE XIV

To a double arm mixer with cooling water in the jacket, 400 grams of n-heptane, 25 grams of TLF–2005 surfactant marketed by Du Pont, and 60 grams of a higher fatty alcohol ester of polyphosphoric acid were charged. Then 600 grams of resinated Red Lake C pigment, #2715 T of Fred'k H. Levey Co., were added and mixing was continued for 10 minutes. Two 100 gram additions of pigment followed, with mixing continued 10 minutes after each addition. Another 75 grams of pigment were then added. Following a mixing period of 15 minutes, 25 grams of pigment were added, followed by the addition of 25 grams of isopropyl acetate. Mixing of the high shear mass continued for three hours. The mass was then reduced with 600 grams of isopropyl acetate until smooth. A 90% yield of base pigment dispersion of reduced viscosity was obtained, the dispersion containing 49.7% by weight pigment, 4.7% surfactant, 13.8% n-heptane and 31.8% isopropyl acetate. This dispersion, when formulated with polyamide resin and n-propyl alcohol, produced a flexographic ink having exceptionally high gloss and high transparency. This ink is particularly suited for printing on films and paper as well as on boxboard.

EXAMPLE XV 125 grams each of VM and P naphtha, n-propyl acetate and 2-nitropropane were charged to a double arm mixer with water in the cooling jacket. To this mixture were added 40 grams of lecithin, 40 grams of oleic acid and 80 grams of a polyethylene polyamine castor oil condensate. Then, 1000 grams of non-crystallizing, non-flocculating phthalocyanine blue pigment, Du Pont BT–417D, were added. The mixture was then mixed for four hours. In this instance, the dispersion of the pigment took place more slowly than is normally the case. The mixture gradually increased in shear during the agitation period until a high shear mass was obtained. Mixing was continued, as is customary in accordance with the invention, for a sufficient time to assure the breaking down of pigment agglomerates. The mass was then reduced with 90 grams of each of the three solvents indicated above. A 97½% yield of colored dispersion was obtained containing 56.8% by weight pigment, 9% surfactant and 11.4% of each of the three solvents. The pigment dispersion in solvent blend thus obtained is one that has the particular advantage of being acceptable under the strictest air pollution regulations currently existing anywhere in the country.

EXAMPLE XVI

To a double arm mixer with water in the cooling jacket, 400 grams of n-heptane, 75 grams of TLF–2005 titanium complex surfactant produced by Du Pont and 40 grams of lecithin were charged and mixed for 15 minutes. 500 grams of a lithol rubine pigment, DC–207 manufactured by Fred'k H. Levey Co., were added and mixed for 10 minutes. Three 100 gram pigment additions were then made, each followed by a five minute mixing period. Two 50 gram pigment additions followed, with mixing continued for five minutes after each addition. After a final 50 gram pigment addition, the mass was mixed for one hour. 25 grams of isopropyl acetate were then added, followed by a mixing period of one hour. Then another 25 grams of isopropyl acetate were added, followed by another one hour mixing period. 25 grams of isopropyl acetate were then added, and mixing was continued for one hour after which 360 grams of isopropyl acetate were added with continuous mixing. A yield of 85% of lithol rubine dispersion was obtained containing 56.2% pigment by weight, 6.8% surfactant, 13.6% n-heptane, and 23.4% isopropyl acetate. This concentrated pigment dispersion can be used for the formulation of a variety of ink and paint coatings exhibiting very high gloss, excellent transparency and excellent pigment dispersion properties.

EXAMPLE XVII 140 grams of VM P naphtha, 140 grams of n-propyl acetate, and 75 grams of fatty alcohol polyphosphoric acid ester surfactant were charged to a double arm mixer with water in the cooling jacket. To this mixture was added 1000 grams of an iron oxide red pigment, "Mapico 297" produced by Columbian Carbon Co. After five minutes of mixing to properly wet out the pigment, another 600 grams of pigment were added. Mixing was continued for 10 minutes, followed by the addition of 500 grams of pigment. After mixing for 10 minutes, another 200 grams of pigment and 15 grams of VM & P naphtha were added to the mixture. Mixing was continued for five minutes. Then another addition of 200 grams of pigment and 15 grams of n-propyl acetate were charged to the mixer. Mixing was continued for 5 minutes after which 200 grams of pigment and 10 grams of surfactant were added to the mixture. After 10 minutes of mixing, 100 grams of pigment and 25 grams of 2-nitro-propane were added. After five minutes of mixing, 100 grams of pigment were added. After five additional minutes of mixing, 50 grams of pigment were added to the mixture. Mixing was continued for five minutes, and then a final 50 grams of pigment were added to the mixer. Mixing of the resulting high shear mass was then continued for three hours to assure the essentially complete break down of agglomerates and the forming of an essentially uniform dispersion of the pigment in the solvent blend. The base dispersion was then reduced with 130 grams of 2-nitro-propane to form a base pigment dispersion of reduced viscosity. A 96.6% yield of pigment dispersion was obtained having the following proportions by weight: 87.5% iron oxide pigment, 2.6% surfactant and 3.3% each of the solvents in the blend, namely VM & P naphtha, n-propyl acetate and 2-nitro-propane. This modified base dispersion, when incorporated in a medium oil length phthalic alkyd and a suitable paint thiner produced a high quality paint exhibiting high gloss and excellent pigment dispersion. When reduced with suitable paint solvent and mixed with chlorinated rubber and plasticizer, this dispersion produced a high gloss, acid resistant coating exhibiting excellent pigment dispersion characteristics.

Base dispersions in organic solvents, as provided herein, have distinct advantages of economy, flexibility and quality as compared with chip dispersions. Thus, the power input requirements are substantially reduced by the practice of the present invention as compared with those required in the high shear milling necessary to incorporate pigment in a binder material in the manufacture of a chip dispersion. The finished coating compositions made from the base dispersions of the present invention, furthermore, have exhibited equal or higher gloss than similar coatings produced from comparable chip dispersions. The transparency of coatings made from the base dispersions of the present invention has been generally equivalent, and sometimes higher, than the transparency of coatings made from chip dispersions.

The base dispersions herein provided are, quite obviously, useful in a wide variety of applications. Chip dispersions, on the other hand, are much less flexible in use as base dispersions since the chip dispersion necessarily includes both a particular pigment and a particular resin or other binder material. The inventory requirements for the base dispersions of the present invention, therefore, may be greatly simplified. In the conventional chipping operation, it is necessary to produce chips of the same pigment in each of the various resin or plastic-type binders that might be employed in the production of coating compositions. A single base pigment dispersion in solvent, on the other hand, may be used in the formulation of a wide variety of high quality inks, paints, and other coatings for a whole series of substrates for application by printing, spraying, dipping, roller coating, curtain coating and the like.

While the present invention has been described herein with reference to a particular embodiments thereof, it will be recognized that various changes and modifications can be made without departing from the scope of the invention as set forth in the appended claims.

Therefore, I claim:

1. A process for the production of pigments in organic solvents consisting essentially of:
   (a) adding pigment to a blend of two or more miscible organic solvents together with surfactant, with mixing, the rate of addition of said pigment being such as to permit wetting out of the pigment in the solvent blend, said addition being continued until a high shear mass is obtained;
   (b) agitating said high shear mass for a period of time sufficient to permit the essentially complete breaking down of agglomerates and the forming of an essentially uniform dispersion of the pigment in the solvent blend,
whereby a highly concentrated, stable base pigment dispersion in the solvent blend is obtained, said dispersion being adaptable for use in a wide variety of coating compositions.

2. The process of claim 1 in which said base pigment dispersion in solvent blend contains generally from about 85% to about 95% by weight of inorganic pigment and from about 2% to about 10% by weight surfactant.

3. The process of claim 1 in which said base pigment dispersion in solvent blend contains generally from about 55% to about 65% by weight of organic solvent and from about 2% to about 10% by weight surfactant.

4. The process of claim 1 in which the rate of addition of said pigment is decreased during the period of time in which said pigment is being incorporated in the organic solvent to form a high shear mass.

5. The process of claim 1 in which said high shear mass is agitated for a period of from about two to about five hours.

6. The process of claim 1 and including the mixing of additional organic solvent with the highly concentrated, base pigment dispersion in order to reduce the viscosity of said base dispersion, said additional organic solvent being miscible with the solvents in the solvent blend.

7. The process of claim 6 in which said additional solvent consists essentially of one or more of the solvents in said solvent blend.

8. The process of claim 6 in which said additional solvent consists essentially of one or more solvents other than those employed in said solvent blend.

9. The process of claim 1 in which the pigment is initially incorporated into a single organic solvent to form a base pigment dispersion, said base dispersion being thereafter mixed with one or more different organic solvents miscible with said single organic solvent to form a base pigment dispersion of reduced viscosity in solvent blend.

10. The process of claim 1 in which at least one of said miscible organic solvents is added during the mixing of pigment and solvent so as to form said final solvent blend during the pigment addition.

11. The process of claim 10 and including the subsequent mixing of additional organic solvent with the base pigment dispersion to reduce the viscosity thereof, said additional solvent being miscible with the solvents in the solvent blend.

12. A highly concentrated, stable base pigment dispersion composition consisting essentially of from about 55% to about 95% by weight pigment; from about 2% to about 10% by weight surfactant; and from about 5% to about 45% by weight organic solvent, said organic solvent consisting essentially of a blend of two or more miscible solvents, the pigment being dispersed substantially uniformly throughout said solvent blend.

13. A highly concentrated, stable base pigment dispersion composition consisting essentially of from about 45% to about 90% by weight pigment; from about 2% to about 10% by weight surfactant; and from about 10% to about 50% by weight organic solvent, said organic solvent consisting essentially of a blend of two or more miscible solvents, the pigment being dispersed substantially uniformly throughout said solvent blend.

14. The composition of claim 12 in which said pigment is an inorganic pigment present in an amount generally within the range of from about 85% to about 95% by weight of said base dispersion composition.

15. The composition of claim 13 in which said pigment is an inorganic pigment present in an amount generally within the range of from about 80% to about 90% by weight of the base dispersion composition.

16. The composition of claim 12 in which said pigment is an organic pigment present in an amount generally within the range of from about 55% to about 65% by weight of the base dispersion composition.

17. The composition of claim 13 in which said pigment is an organic pigment present in an amount generally within the range of from about 45% to about 55% by weight of the base dispersion composition.

18. The composition of claim 12 in which the surfactant concentration is within the range of from about 2% to about 6% by weight of said base pigment dispersion composition.

19. The composition of claim 13 in which the surfactant concentration is within the range of from about 2% to about 6% by weight of said base pigment dispersion composition.

References Cited

UNITED STATES PATENTS

| | | | |
|---|---|---|---|
| 3,200,000 | 8/1965 | Williams | 106—309 |
| 3,249,454 | 5/1966 | Williams | 106—309 |
| 3,249,455 | 5/1966 | Williams | 106—309 |
| 3,354,111 | 11/1967 | Henderson et al. | 106—308NX |
| 3,404,993 | 10/1968 | Sanders | 106—308 |

FOREIGN PATENTS

| | | | |
|---|---|---|---|
| 976,084 | 11/1964 | Great Britain | 106—308 |

JAMES E. POER, Primary Examiner

H. M. S. SNEED, Assistant Examiner

U.S. Cl. X.R.

106—309; 260—41